US006244559B1

(12) United States Patent

Stanton

(10) Patent No.: US 6,244,559 B1
(45) Date of Patent: Jun. 12, 2001

(54) PAINTBRUSH HANGER HAVING DUAL FASTENING MEANS

(76) Inventor: Robert Stanton, 25 Turner St., No. 4, Portland, ME (US) 04101

(*) Notice: Subject to any disclaimer, the term of this patent is extended or adjusted under 35 U.S.C. 154(b) by 0 days.

(21) Appl. No.: 09/522,344

(22) Filed: Mar. 9, 2000

(51) Int. Cl.[7] ........................ F16M 13/02; F16B 45/00; A46B 17/00

(52) U.S. Cl. ........................ 248/692; 248/312.1; 15/246

(58) Field of Search ........................ 248/682, 683, 248/692, 205.2, 205.3, 205.4, 220.22, 222.13, 225.21, 304, 312.1, 110, 213.2, 215, 211; 15/246

(56) References Cited

U.S. PATENT DOCUMENTS

| | | | |
|---|---|---|---|
| 2,273,642 | 2/1942 | Henderson | 248/685 |
| 2,309,990 | 2/1943 | Savi | 15/174 |
| 2,905,419 | 9/1959 | Carson | 248/110 |
| 2,988,768 | 6/1961 | Hill | 401/124 |
| 3,231,919 | 2/1966 | MacDonald | 15/174 |
| 3,612,464 | 10/1971 | Harrah | 248/685 |
| 4,757,568 | 7/1988 | Jones | 15/105 |
| 4,887,327 | 12/1989 | Meimeteas | 15/246 |
| 5,087,014 | 2/1992 | Desjardin | 248/692 |
| 5,472,251 | 12/1995 | Deininger | 294/19.2 |
| B1 5,405,116 * | 4/1995 | Shepherd et al. | 248/312.1 |
| B1 5,873,555 * | 2/1999 | Crace | 248/312.1 |

* cited by examiner

*Primary Examiner*—Ramon O. Ramirez
*Assistant Examiner*—Jon Szumny
(74) *Attorney, Agent, or Firm*—Charles F. Seyboldt

(57) ABSTRACT

A paintbrush hanger is provided that may be fastened to a paintbrush either permanently or temporarily. In one embodiment, the attachment pad of the hanger has an adhesive backing, whereby the user can permanently attach the hanger to the paintbrush. The hook portion of the hanger is hollow, so that the user can temporarily attach the hanger to the paintbrush by inserting a nail or a screw through the hook and the attachment pad and into the handle of the paintbrush. When the paintbrush hanger is fastened to the paintbrush in this manner, the hanger may be subsequently removed simply by pulling the nail or unscrewing the screw out of the paintbrush. The paintbrush hanger may then be reused on a different brush or another tool. Further, when used, the nail or screw fastener provides additional rigidity and strength to the hook portion of the hanger. The hanger may also be fastened to the paintbrush using both the adhesive and the nail or screw, for maximum fastening strength and maximum rigidity of the hook.

13 Claims, 2 Drawing Sheets

PAINTBRUSH HANGER HAVING DUAL FASTENING MEANS

BACKGROUND OF THE PRESENT INVENTION SUMMARY OF THE PRIOR ART

This invention relates to a paintbrush hanger, and more particularly to a paintbrush hanger having dual means for attachment to a paintbrush or other tool. The hanger is designed to provide a facility for temporarily hanging a paintbrush on a paint can.

The paintbrush hanger according to the present invention may be fastened to a paintbrush (or other tool) with an adhesive, or with a nail, or with both. When an adhesive is used for fastening, it is applied to an attachment pad portion of the hanger. When a nail (or brad or screw) is used for fastening, it passes through an axial hole in the hook portion of the hanger.

Paintbrush hangers are applied to paintbrushes (or to paint cans) for a variety of purposes, such as transportation of the paintbrush and paint can while the paint can is open, to allow draining of the paintbrush after it has been cleaned with the appropriate solvent, or to conveniently provide multiple paintbrushes to the painter, e.g. a straight brush and an angled brush. Various hanging devices have been proposed for keeping paintbrushes when they are not in immediate use.

U.S. Pat. No. 2,273,642, to F. A. Henderson, discloses a hanging means that comprises a brush handle having an pin 20, angled to the longitudinal axis of the brush and an angled hole 22 which fits loosely to the pin. At column 1, lines 41 to 49 the pin is described as being possibly a brad or a nail, which may be driven into the handle, or may be pressed into a pre-existing hole in the handle.

U.S. Pat. No. 2,309,990, to J. J. Savi, discloses a hanging means 5 that is formed by bending a portion of the 'bristle binder" 4 or ferrule portion of the brush itself.

U.S. Pat. No. 2,905,419, to O. L. Carson, discloses the combination of a device attached to the paint bucket and a hook attached to a paintbrush. At column 3, lines 3 to 28, the inventor describes hook 45 as being any well known type having a threaded end screwed into a brush. Hook 45 extends normal to the face of the brush handle, and then is bent at an angle to effect a hanging ability on a lip or edge, as shown in FIGS. 1 and 6 of the patent.

U.S. Pat. No. 2,988,768, to R. W. Hill, discloses the combination of a U-shaped wire 18 affixed to the handle of a paintbrush, and a bracket 8, which can be temporarily fastened to a paint can.

U.S. Pat. No. 3,231,919, to W. A. MacDonald, discloses a hanging device 13 that is formed by the bending of tubular ferrule 12.

U.S. Pat. No. 3,612,464, to J. L. Harrah, discloses a one piece brush support hook 6 that is to be integrated with a brush assembly 7 during its manufacture. The crimping of the ferrule 10 provides the means whereby the unitary wire is fastened to the brush assembly. This process is described at column 2, lines 11 to 14.

U.S. Pat. No. 5,472,251, to E. L. Deininger, discloses a hook device fastened to one end of a long shafted tool, in this case a golf ball retriever. At column 3, starting at line 30, the inventor describes the grip end of the tool being fabricated with the hook, and at line 35 indicates that the hook is preferably of the same material as the grip.

U.S. Pat. No. 4,887,327, to A. Meimeteas, beginning at column 2, line 35, discloses a hook (hanger) 14 that may be temporarily held to a brush by an elastomeric ferrule cover 11. This description is repeated at column 3, beginning at line 7.

U.S. Pat. No. 5,087,014, to W. Desjardin, discloses a deformable clip device 10 that may be fastened to the handle of a paintbrush. Additionally, at column 2, beginning at line 54, the inventor suggests that clip 10 may be integrally formed in the handle of the tool, or may be sold as a separate piece, or may be sold attached to the tool.

U.S. Pat. No. 4,757,568, to J. A. Jones, discloses a paint brush having a combination prying and hanging device 22 securely attached to the handle of the brush. At column 3, beginning at line 41, the fastening means of studs is specifically disclosed.

SUMMARY OF THE PRESENT INVENTION

In one embodiment, the paintbrush hanger of the present invention comprises a flat, relatively thin attachment pad that might have dimensions of approximately one-half inch by one inch, and a bent hook portion having a cylindrical cross section of approximately one-quarter inch in diameter, that is either connected to, or an integral part of the attachment pad. The bent hook portion has two sections, a first straight section being normal to the front face of the attachment pad and having a hole along its longitudinal axis (and through the plane of the attachment pad); and a second straight section being at an approximate ninety degree angle to the first straight section. The bent hook portion, in conjunction with an edge, e.g. the edge of a paint can, is thereby effective to hold the brush so that its bristles are not bent.

Also, the paintbrush hanger of the present invention includes dual means for fastening the hook to the object to be hung. The two fastening means of the present invention are 1) an adhesive applied between the attachment pad and the paintbrush, and 2) a brad or nail or screw. In use of the present invention, a user could use either of these two fastening means alone. Specifically, the user could choose not to apply or expose the adhesive on the back face of the attachment pad, for example, by leaving an adhesive protective film in place, and fasten the hanger to the paintbrush with a brad or nail or screw that passes through the first section of the bent portion of the hanger, and into the handle of the paintbrush. Using this fastening method, a user could easily detach the hanger, and use it on another brush or tool.

Alternatively, the user could choose to expose (or apply) an adhesive film on the back face of the attachment pad, and fasten the paintbrush hanger to the paintbrush solely with the adhesive. This fastening method is of a more permanent nature, i.e. the user would not be likely to casually remove and reattach the hanger after it has been applied to a brush with adhesive. In yet another fastening strategy, a user might choose to use both the adhesive and the brad or nail or screw, with the brad or nail or screw providing additional strength to the fastening means, and additional rigidity to the bent portion of the hanger.

The present invention relates to a paintbrush hanger having dual fastening means that may be fastened to a paintbrush with an adhesive, or with a nail (or brad or screw) or with both. Specific features of the invention will be apparent from the above and from the following description of the illustrative embodiments when considered with the attached drawings and the appended claims.

In summary, and in accordance with the above discussion, the foregoing objectives are achieved in the following embodiments.

1. A paintbrush hanger comprising:

an attachment pad having a front face and a rear face, and having a through hole extending in a normal direction from the front face to the rear face; and a hook protruding from the front face of the attachment pad, the hook having a first section and a second section, the first section of the hook being substantially straight and having a longitudinal axis that is substantially normal to the attachment pad, the first section of the hook also having a longitudinal hole, the hole in the first section of the hook being in communication with the through hole in the attachment pad, the second section of the hook being disposed at an angle to the longitudinal axis of the first section of the hook.

2. The paintbrush hanger, as described in paragraph 1, and further comprising an adhesive being disposed over a substantial area of the rear face of the attachment pad.

3. The paintbrush hanger, as described in paragraph 2, and further comprising a releasable protective sheet over the adhesive.

4. The paintbrush hanger, as described in paragraph 1, wherein the attachment pad has a flat planar configuration.

5. The paintbrush hanger, as described in paragraph 1, wherein the attachment pad has a curved configuration.

6. The paintbrush hanger, as described in paragraph 1, wherein the first section of the hook has a hollow cylindrical shape and the second section of the hook has a solid cylindrical shape.

7. The paintbrush hanger, as described in paragraph 1, wherein the first section of the hook has a hollow prismatic shape.

8. The paintbrush hanger, as described in paragraph 1, wherein the paintbrush hanger is a unitary construction made of a plastic material.

9. The paintbrush hanger, as described in paragraph 8, wherein the hole in the first section of the hook and the hole through the attachment pad are coaxial.

10. The paintbrush hanger, as described in paragraph 1, and further comprising an adhesive tape having a web section and first and second sticky faces, and where the first sticky face is in contact with the rear face of the adhesive pad.

11. The paintbrush hanger, as described in paragraph 10, wherein the web section of the adhesive tape is made of a resilient material, whereby the adhesive tape is conformable to irregular attachment surfaces.

12. The paintbrush hanger, as described in paragraph 8, wherein the second section of the hook is disposed at an approximate 90 degree angle to the axis of the first section of the hook.

13. The paintbrush hanger, as described in paragraph 8, wherein the attachment pad is between approximately one half-inch and approximately three inches in width, and is between approximately one half-inch and approximately three inches in height, and is between approximately one-sixteenth and approximately one-half inch in thickness;

wherein the first and second sections of the hook are between approximately one-eighth inch and approximately three-eighths inch in cross section;

wherein the first section of the hook is between approximately one-half inch and approximately two inches in length; and wherein the second section of the hook is between approximately one-quarter inch and approximately one inch in length.

DESCRIPTION OF THE PREFERRED EMBODIMENTS OF THE PRESENT INVENTION

Figure 1:
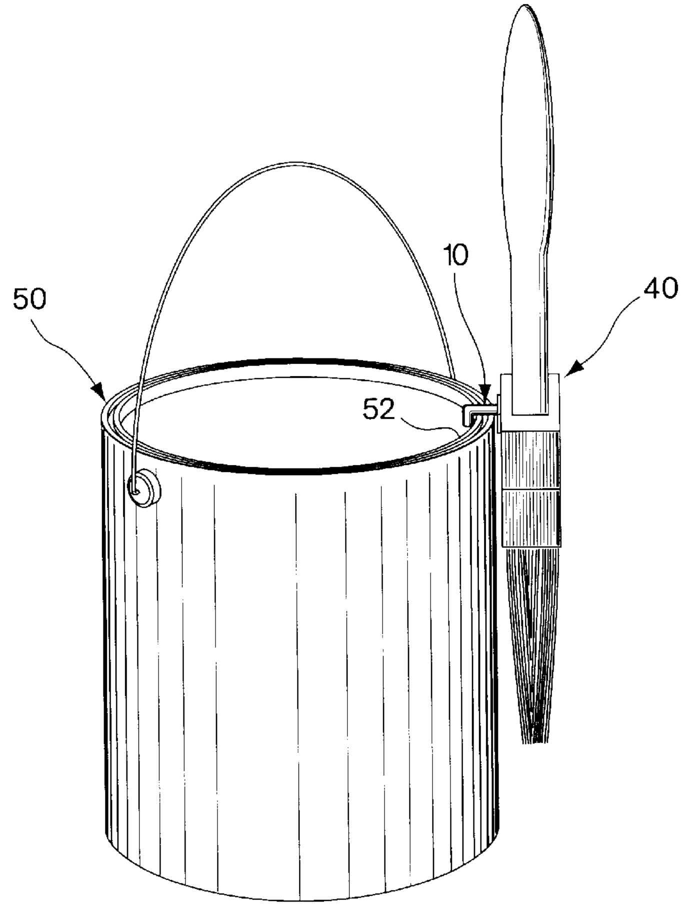
FIG. 1 is a perspective view showing the "in use" relationship between the present invention, a paintbrush, and an open paint can.

FIG. 1 is a perspective view showing the "in use" relationship between the present invention 10, a paintbrush 40, and an open paint can 50.

As shown in FIG. 1, the paintbrush hanger 10 of the present invention may be fastened to a paintbrush 40, whereby it may be hung on the lip 52 of paint can 50. Although not shown in the drawings, the paintbrush hanger of the present invention may also be applied to a tool other than a paint brush; for example a paint scraping tool or a utility knife or a squeegee or an adhesive applicator, etc. Also, the paintbrush hanger of the present invention may be adapted to hang a tool (paintbrush) in a location other than on the edge of a paint can; for example the tool (paintbrush) may be hung on the rung of a ladder or on a horizontally disposed rod, etc.

Figure 2:
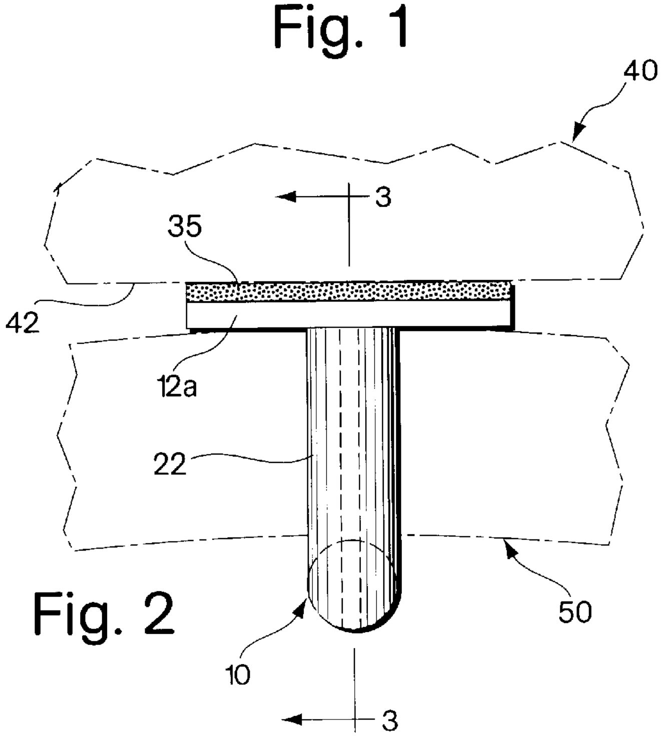
FIG. 2 is a plan view of an embodiment of the present invention, showing a flat attachment pad.

FIG. 2 is a plan view of an embodiment of the present invention, showing a flat attachment pad 12*a*, the straight section 22 of the hook 20, and the optional adhesive tape 35, as well as partial phantom outlines of a paintbrush 40 and a paint can lip 52.

Figure 3:
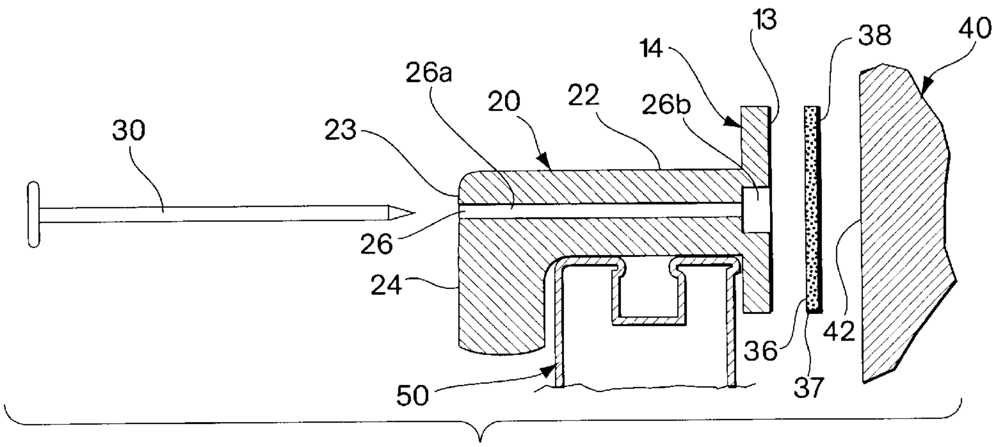
FIG. 3 is an exploded cross-sectional view, taken on and in the direction shown by line 3—3 in FIG. 2.

FIG. 3 is an exploded cross-sectional view, taken on, and in the direction shown by line 3—3 in FIG. 2, and showing the attachment pad 12*a*, the hook 20, the through hole 26, the optional adhesive tape 35 and nail 30, as well as the lip of a paint can 50 and a portion of a paintbrush 40.

Figure 4:
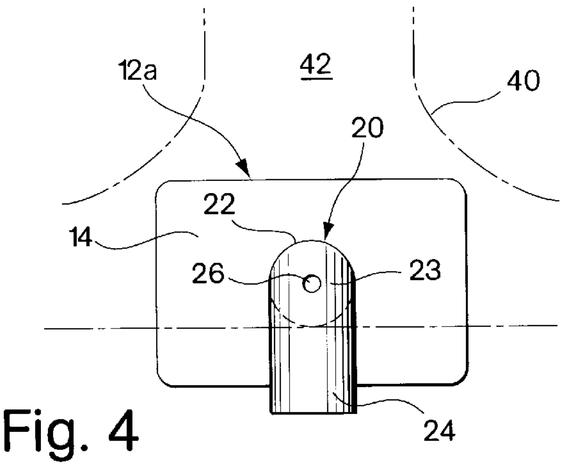
FIG. 4 is a front elevational view of an embodiment of the resent invention.

FIG. 4 is a front elevational view of an embodiment of the present invention, showing the front face 14 of the attachment pad 12*a*, front face 23 of straight section 22, and the second section 24 of the hook 20, as well as a phantom outline of a paintbrush handle 40.

Paintbrush hanger 10 comprises an attachment pad 12 and a hook portion 20. Attachment pad 12*a* has a rear face 13 and a front face 14. Hook portion 20 of the paintbrush hanger has a straight section 22 that protrudes from the front face 14 of the attachment pad, and, in the embodiments shown in FIGS. 1 through 5, the hook portion also has a bent section 24. As shown in the drawings, straight section 22 of the hook portion has a through axial hole 26 that extends to rear face 13 of the attachment pad.

FIGS. 1 through 5 illustrate an embodiment of the paintbrush hanger wherein straight section 22 and bent section 24 of the hook portion 20 have circular cross sections. However, it is contemplated that the cross section of straight section 22 and/or the cross section of bent section 24 may be elliptical, triangular, square, rectangular, pentagonal, hexagonal, octagonal, or any other desirable shape.

Axial hole 26 may be a cylindrical configuration of constant diameter along its length, or it may be tapered, or it may be a stepped configuration. FIGS. 2 and 3 show a cylindrical axial hole 26 having a stepped configuration, with section 26*b* in the attachment pad being a larger diameter than section 26*a* extending through straight section 22 of the hook portion. Further, it is contemplated that axial hole 26 may have a triangular, square, or hexagonal, or any other desirable configuration.

In addition, it is contemplated that axial hole 26 may be blind, i.e., it may extend all the way through straight section 22 but not to the rear face 13 of attachment pad 12*a* (12*b*), or it may extend through attachment pad 12*a* (12*b*) but not all the way to front face 23 of straight portion 22. If axial hole 26 is blind, it is contemplated that the amount of material blocking hole 26 will be relatively small, such that the introduction of a nail 30 (or screw, or brad) will not be made overly difficult. The presence of flashing at either end of hole 26, or the deliberate construction of a blockage in hole 26 in order to firmly grip optional nail 30 (even when the nail is not driven into the brush) is within the conception of the present invention.

Although not shown in the drawings, the paintbrush hanger according to the present invention may be adapted to hang with other than a bent portion on the hook. For example, a spherical ball configuration may be constructed in place of bent section 24, and a separate spherical socket may be provided that would accept and hold the ball of the hanger.

FIG. 2 illustrates an embodiment having an adhesive tape 35 between the attachment pad 12*a* of the hanger and face 42 of paintbrush 40. FIG. 3 is an exploded view of the FIG. 2 embodiment, showing a web 37 of an adhesive tape 35, first sticky surface 36 of the adhesive tape, and second sticky surface 38 of the adhesive tape. It is contemplated that the present invention may be embodied in a hanger having adhesive tape 35 applied to the rear face 13 of the attachment pad 12*a*, and also having a releasable protective covering (not shown) over second sticky surface 38. Web 37 of the adhesive tape may be formed from a resilient foam material, so that the second sticky surface 38 can conform to irregularities on surface 42 of brush 40 (e.g. metal ferrules used to hold brush bristles to brush handles). In an alternate embodiment, the present invention may have an adhesive applied directly to the rear face 13 of the attachment pad, i.e. without a tape having a web. If an adhesive is present on the rear face 13 of the attachment pad, various combinations of tape/no tape and releasable protective covering/no releasable protective covering are contemplated as within the scope of the present invention. It is contemplated that the hanger of the present invention may be attached to a paintbrush or other tool using only an adhesive. The adhesive fastening is contemplated to be effective on tools in a variety of constructions, e.g. tools with or without metal ferrules, tools having wood handles, tools having plastic handles, or tools having metallic construction such as utility knives. When an adhesive is used to fasten the hanger to a tool, it is contemplated that the hanger will be "permanently" attached to the tool, i.e. removal of the hanger will result in the destruction of the adhesive or adhesive tape.

FIG. 3 illustrates the relationship between a hanger 10 of the present invention and a nail 30 that may be used to fasten the hanger to a paintbrush 40. Nail 30 passes through hole 26*a* in straight section 22 of the hook, and through hole 26*b* in attachment pad 12*a*. The nail 30 then penetrates into the handle of the tool, and serves to hold the hanger to the tool. In addition to fastening the hanger to the tool, the nail increases the rigidity of the straight section 22 of the hook 20. It is contemplated that a screw or a brad (not shown) may be used, rather than a nail. When a nail (or screw or brad) is used to fasten the hanger to a tool, it is contemplated that the hanger may be easily removed, and applied to a different tool.

The hanger of the present invention may also be fastened to a paintbrush or other tool using both an adhesive (or an adhesive tape) and a nail (or a brad or a screw). When used in this manner, maximum fastening strength and maximum rigidity of the straight section of the hook are achieved.

Figure 5:
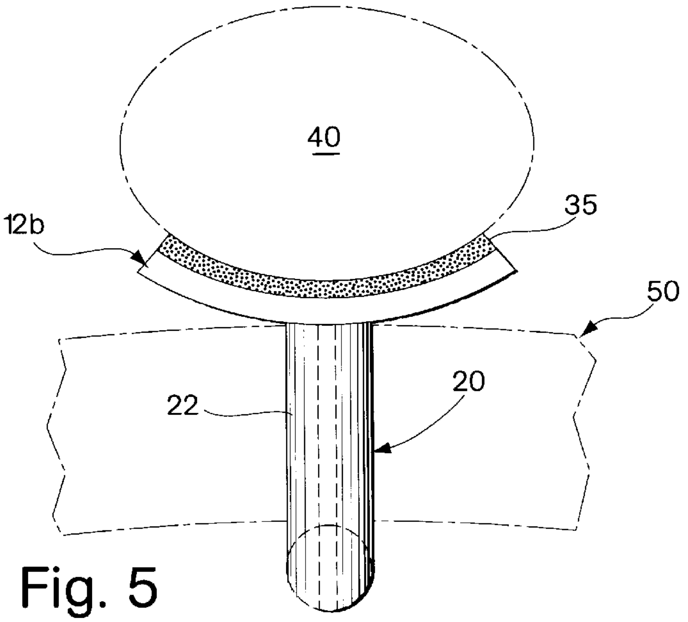
FIG. 5 is a plan view of an alternate embodiment of the present invention, showing a curved attachment pad.

FIG. 5 is a plan view of an alternate embodiment of the present invention, showing a curved attachment pad 12*b*, the first section 22 of the hook, and the optional adhesive tape 35, as well as partial phantom outlines of a paintbrush 40 and a paint can 50. It is contemplated that the hanger according to the present invention may be practiced with an attachment pad of any desirable configuration, in order to conform with tool handles having various shapes.

The drawings necessarily show specific structural arrangements embodying the invention. However, it will be appreciated that the invention can be practiced in various forms and structural combinations.

The present invention, described above, relates to a paintbrush hanger having dual fastening means. Features of the present invention are recited in the appended claims. The drawings contained herein necessarily depict structural features and embodiments of the paintbrush hanger having dual fastening means, useful in the practice of the present invention.

However, it will be appreciated by those skilled in the arts pertaining thereto, that the present invention can be practiced in various alternate forms, proportions, and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What I claim is:

1. A paintbrush hanger comprising:

an attachment pad having a front face and a rear face, and having a through hole extending in a normal direction from the front face to the rear face; and a hook protruding from the front face of the attachment pad, the hook having a first section and a second section, the first section of the hook being substantially straight and having a longitudinal axis that is substantially normal to the attachment pad, the first section of the hook also having a longitudinal hole, the hole in the first section of the hook being in communication with the through hole in the attachment pad, the second section of the hook being disposed at an angle to the longitudinal axis of the first section of the hook.

2. The paintbrush hanger, as described in claim 1, and further comprising an adhesive being disposed over a substantial area of the rear face of the attachment pad.

3. The paintbrush hanger, as described in claim 2, and further comprising a releasable protective sheet over the adhesive.

4. The paintbrush hanger, as described in claim 1, wherein the attachment pad has a flat planar configuration.

5. The paintbrush hanger, as described in claim 1, wherein the attachment pad has a curved configuration.

6. The paintbrush hanger, as described in claim 1, wherein the first section of the hook has a hollow cylindrical shape and the second section of the hook has a solid cylindrical shape.

7. The paintbrush hanger, as described in claim 1, wherein the first section of the hook has a hollow prismatic shape.

8. The paintbrush hanger, as described in claim 1, wherein the paintbrush hanger is a unitary construction made of a plastic material.

9. The paintbrush hanger, as described in claim 8, wherein the hole in the first section of the hook and the hole through the attachment pad are coaxial.

10. The paintbrush hanger, as described in claim 1, and further comprising an adhesive tape having a web section and first and second sticky faces, and where the first sticky face is in contact with the rear face of the adhesive pad.

11. The paintbrush hanger, as described in claim 10, wherein the web section of the adhesive tape is made of a resilient material, whereby the adhesive tape is conformable to irregular attachment surfaces.

12. The paintbrush hanger, as described in claim 8, wherein the second section of the hook is disposed at an approximate 90 degree angle to the axis of the first section of the hook.

13. The paintbrush hanger, as described in claim 8, wherein the attachment pad is between approximately one half-inch and approximately three inches in width, and is between approximately one half-inch and approximately three inches in height, and is between approximately one-sixteenth and approximately one-half inch in thickness;

wherein the first and second sections of the hook are between approximately one-eighth inch and approximately three-eighths inch in cross section;

wherein the first section of the hook is between approximately one-half inch and approximately two inches in length; and wherein the second section of the hook is between approximately one-quarter inch and approximately one inch in length.

* * * * *